United States Patent [19]
Coad et al.

[11] B 3,981,974
[45] Sept. 21, 1976

[54] METHOD FOR PRODUCING AN ALKALI METAL PYROPHOSPHATE

[75] Inventors: Peter Coad, Midwest City; Edward Conley Murray, Oklahoma City, both of Okla.; Homer Charles Reed, Newport Beach, Calif.

[73] Assignee: Kerr-McGee Chemical Corporation, Oklahoma City, Okla.

[22] Filed: May 20, 1974

[21] Appl. No.: 471,221

[44] Published under the second Trial Voluntary Protest Program on January 13, 1976 as document No. B 471,221.

[52] U.S. Cl. .................................................. 423/315
[51] Int. Cl.² .................... C01B 15/16; C01B 25/26
[58] Field of Search ............................ 423/315, 314

[56] References Cited
UNITED STATES PATENTS 3,473,889   10/1969   Shen ................................. 423/315

*Primary Examiner*—Oscar R. Vertiz
*Assistant Examiner*—Gregory A. Heller
*Attorney, Agent, or Firm*—William G. Addison

[57] ABSTRACT

The present invention relates to a method for producing an alkali metal pyrophosphate useful, for example, as a plant food. Broadly, the method comprises reacting an alkali metal nitrate and aqueous phosphoric acid in the presence of catalytic amount of a metal oxide at a temperature of at least about 700°C to produce a substantially pure alkali metal pyrophosphate and gaseous reaction products.

12 Claims, No Drawings

METHOD FOR PRODUCING AN ALKALI METAL PYROPHOSPHATE

BACKGROUND OF THE INVENTION

The use of liquid fertilizers has been known for some time. Indeed, it is reported that Sir Humphrey Davey experimented with solutions of inorganic fertilizers as early as 1808. The principal liquid fertilizers used in the U.S. usually contain at least two of the primary plant nutrients, viz. N, $P_2O_5$, and $K_2O$. The use of liquid fertilizers has several advantages. Liquids are, of course, readily transportable by pumping. Further, liquids can be metered more accurately and evenly dispersed than solids. Still further, herbicides, insecticides, and other additives are readily admixed with the liquid fertilizers and hence more evenly distributed upon the surface of the soil and plants.

Potassium pyrophosphate is particularly amenable to use as a liquid fertilizer. More particularly, potassium pyrophosphate ($K_4P_2O_7$) is 100 percent plant food (57 percent $K_2O$ and 43 percent $P_2O_5$). Further, potassium pyrophosphate has a high solubility in water at ambient temperatures (50–65 percent by weight) and, thus, has a lower application cost per pound than those fertilizers having a lower solubility and necessarily requiring the application of a greater volume of solution to provide an equivalent amount of plant food.

One method of producing potassium pyrophosphate proposed heretofore involves several separate steps. In the first step, potassium hydroxide is produced electrolytically by feeding potassium chloride into a mercury cell to produce an aqueous solution of potassium hydroxide. In the second step, the solution of potassium hydroxide is reacted with aqueous phosphoric acid to form a solution of di-potassium orthophosphate ($K_2HPO_4$). The water then is evaporated from the di-potassium orthophosphate and the orthophosphate is calcined at approximately 750°C to produce potassium pyrophosphate.

A disadvantage of this method is that the capacity is fixed by the size or number of electrolytic cells available.

More recently in U.S. Pat. No. 3,361,523, a two-step method of preparing various crystalline condensed phosphates is suggested. Broadly, the method comprises reacting a condensed phosphoric acid with a sufficient amount of an alkali metal or alkaline earth metal source to form the desired product. In the first step, an amorphous intermediate condensed phosphate material is formed. That material then is ground and calcined at a temperature below the liquification temperature of the desired product for a time sufficient to effect a solid phase conversion.

A disadvantage of this method is that it requires the use of a condensed phosphoric acid as a starting material.

Both of the foregoing methods require multiple steps to produce an alkali metal pyrophosphate. Obviously, it would be desirable to have a one-step method of producing an alkali metal pyrophosphate. Further, it would be desirable to be able to use an inexpensive, readily available starting material such as, for example, wet process phosphoric acid.

SUMMARY OF THE INVENTION

Broadly, the present invention provides a method for producing an alkali metal pyrophosphate by admixing an alkali metal nitrate with aqueous phosphoric acid. The admixture is heated to a temperature of at least about 700°C in the presence of a catalytic amount of a metal oxide for a period of time sufficient to produce the desired alkali metal pyrophosphate. The preferred catalyst materials are the oxides of iron and vanadium. A particularly preferred catalyst is vanadium pentoxide.

DETAILED DESCRIPTION OF THE INVENTION

A method now has been found for producing an alkali metal pyrophosphate directly from an aqueous solution of phosphoric acid. The term aqueous phosphoric acid as used herein includes aqueous solutions of substantially pure phosphoric acid and phosphoric acid solutions obtained by leaching phosphate deposits with an acid such as, for example, sulfuric acid. The source of phosphoric acid is not critical provided that it contains at least about 20% by weight $P_2O_5$. Preferably, the phosphoric acid solution will contain from about 20% to about 70% by weight $P_2O_5$. Obviously, the phosphoric acid solution also should be substantially free of impurities which are plant or animal poisons if the alkali metal pyrophosphate product is to be used as a fertilizer.

The aqueous phosphoric acid and alkali metal nitrate are reacted at a temperature of at least about 700°C. Generally, the reaction temperature is maintained at from about 700°C to 1000°C or higher. The preferred temperature is from about 750°C to 950°C. The reaction generally is complete within from about 2 to 10 minutes at a temperature of about 800°C. It is preferred that the admixture be heated to a temperature above the melting point of the alkali metal pyrophosphate to provide a liquid phase product and, thus, facilitate its recovery from the reaction mixture. When the alkali metal pyrophosphate is potassium pyrophosphate a temperature of about 950°C is sufficient to maintain it in a molten state.

It is an essential feature of the present invention that the reaction be carried out in the presence of a catalytic amount of a metal oxide. The applicable metal oxide catalysts include oxides of iron, vanadium, manganese and chromium. The preferred catalysts are the oxides of vanadium. Particularly good results are obtained using vanadium pentoxide as the catalyst.

Advantageously, the catalyst is present in an amount of from about 0.1 to 0.6 grams per 100 grams of alkali metal nitrate and preferably from about 0.2 to 0.4 grams of catalyst per 100 grams of alkali metal nitrate. The alkali metal nitrate and aqueous phosphoric acid solutions are, of course, present in an amount sufficient to provide a molar ratio of alkali metal to phosphorus of about 2:1.

The method of the present invention is applicable to nitrates of any of the alkali metals. However, only sodium nitrate and potassium nitrate are of any present commercial value. Potassium nitrate is the preferred alkali metal nitrate since the end product then provides potassium pyrophosphate which is 100% plant food and, thus, has particular utility as a fertilizer.

The reaction may be exemplified by the following formulas wherein, solely for purposes of illustration, the alkali metal is potassium.

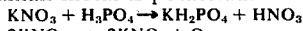
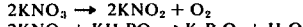

As shown by equation 1, the potassium nitrate and phosphoric acid react to form potassium hydrogen phosphate and nitric acid. This part of the reaction will take place at about room temperature. Upon continued heating to at least about 700°C, the unreacted potassium nitrate is reduced to potassium nitrite as illustrated in equation 2. The potassium nitrite reacts with the potassium hydrogen phosphate to produce the desired alkali metal pyrophosphate product as illustrated in equation 3.

In addition to the alkali metal pyrophosphate, gases also are generated. The product gases include water vapor, nitric acid, and oxides of nitrogen. When the reaction is effected in the presence of the metal oxide catalyst, the conversion is substantially quantitative and the product alkali metal pyrophosphate contains only those non-volatile impurities initially present in the starting materials.

When one of the starting materials is, for example, a wet process phosphoric acid the impurities generally will comprise less than a total of about 2% by weight of such metals as sodium, aluminum, iron, magnesium, silicon, titanium and trace amounts of various other metals.

When the alkali metal pyrophosphate is potassium pyrophosphate, it advantageously is ground to a particle size of less than about 8 mesh (U.S. sieve size) to facilitate its solution in water. The potassium pyrophosphate prepared in accordance with the present method is highly soluble in water. Indeed, aqueous solutions containing up to about 65 weight percent potassium pyrophosphate may be formed at ambient temperatures. Such solutions are readily transportable and may be applied directly to plants or they may, of course, be further diluted before application to the plants.

To illustrate, but not to limit the invention, the following examples are presented. All parts and percentages given are by weight unless otherwise indicated.

EXAMPLE I

One hundred and one grams of a reagent grade potassium nitrate (1 mole) and 58 grams of an 85 percent by weight phosphoric acid solution (0.5 mole) are admixed in a container. To the container is added vanadium pentoxide in an amount of about 0.2 grams per hundred grams of potassium nitrate. The temperature of the admixture is increased to about 800°C and maintained at that temperature for about 10 minutes. The gases evolved during heating are collected, analyzed and found to consist essentially of water vapor, oxides of nitrogen, and nitric acid.

The admixture are cooled, analyzed and found to consist of potassium pyrophosphate having a purity of greater than about 99% and a nitrate content less than about 0.2%.

When the foregoing example is repeated without the presence of a metal oxide catalyst, the product is found to contain substantial quantities of nitrate.

EXAMPLE II

The procedure of Example I is repeated except using a wet process phosphoric acid (54 percent by weight $P_2O_5$) obtained from the acid leaching of a calcium phosphate deposit. The product is recovered and analyzed for impurities. The analytical results are set forth in the following Table.

| Component | Weight Percent |
| --- | --- |
| $Na_2O$ | 0.51 |
| Al | 0.2 |
| B | 0.005 |
| Ca | 0.001 |
| Cr | 0.01 |
| Cu | 0.0003 |
| Fe | 0.7 |
| Mg | 0.2 |
| Mn | 0.02 |
| Ni | 0.001 |
| Si | 0.2 |
| Ti | 0.1 |
| V | 0.06 |
| Zr | 0.002 |

The product also is analyzed for the presence of other phosphates. It is determined that the balance of the product is greater than 99 percent potassium pyrophosphate and less than 0.2 percent nitrates, thus, demonstrating that substantially quantitative conversion is effected by the method of the present invention even with an impure phosphoric acid.

Samples of the product potassium pyrophosphate are admixed with water at ambient temperature and found to be soluble in solutions containing up to 65 weight percent $K_4P_2O_7$.

The sample solutions are stored for a time in excess of 30 days and no precipitation of the potassium pyrophosphate is observed. The solutions are a light pink in color and have a pH of about 10.

EXAMPLE III

The procedure of Example I is repeated using sodium nitrate and an aqueous phosphoric acid. Eighty-five grams of sodium nitrate (1 mole) and 58 grams of an 85% by weight phosphoric acid (0.5 mole) are admixed in a container. To the container is added ferric oxide in an amount of about 0.4 grams per hundred grams of sodium nitrate. The admixture is heated to a temperature of 825°C and maintained at that temperature for about 10 minutes. Thereafter, the admixture is recovered, analyzed and found to contain greater than about 99% sodium pyrophosphate and less than about 0.2% nitrates.

While the invention has been described with respect to what at present are preferred embodiments it will be understood, of course, that certain changes, modifications and the like may be made without departing from its true scope as defined by the appended claims.

What is claimed is:

1. A method for producing an alkali metal pyrophosphate comprising: admixing an alkali metal nitrate with aqueous phosphoric acid, heating said admixture to a temperature of at least about 700°C in the presence of a catalytic amount of at least one metal oxide selected from the group consisting of oxides of iron, vanadium, manganese and chromium for a period of time sufficient to produce said alkali metal pyrophosphate and gaseous reaction products and recovering said alkali metal pyrophosphate.

2. The method of claim 1 wherein the alkali metal nitrate is selected from the group consisting of sodium nitrate and potassium nitrate.

3. The method of claim 1 wherein the metal oxide is vanadium pentoxide.

4. The method of claim 1 wherein the catalyst is present in an amount of from about 0.1 to 0.6 grams per 100 grams of alkali metal nitrate.

5. The method of claim 1 wherein the admixture is heated to a temperature of from about 700°C to 1000°C.

6. The method of claim 1 wherein the aqueous phosphoric acid contains from about 20% to 70% by weight $P_2O_5$.

7. The method of claim 1 wherein the aqueous phosphoric acid is a wet process phosphoric acid.

8. A method for producing a substantially pure alkali metal pyrophosphate comprising admixing an alkali metal nitrate and an aqueous phosphoric acid containing from about 20% to 70% by weight $P_2O_5$, said alkali metal nitrate and phosphoric acid being present in an amount sufficient to provide an alkali metal to phosphorus molar ratio of about 2:1, heating said mixture to a temperature above the melting point of the alkali metal pyrophosphate in the presence of a catalytic amount of at least one metal oxide selected from the group consisting of oxides of iron, vanadium, manganese and chromium for a time sufficient to produce gaseous reaction products and a melt of a substantially pure alkali metal pyrophosphate and recovering said alkali metal pyrophosphate.

9. The method of claim 8 wherein the alkali metal nitrate is selected from the group consisting of sodium nitrate and potassium nitrate.

10. The method of claim 8 wherein the metal oxide is vanadium pentoxide.

11. The method of claim 10 wherein the alkali metal nitrate is potassium nitrate.

12. The method of claim 11 wherein the admixture is heated to a temperature of about 950°C.

* * * * *